May 22, 1951     F. M. HARRISON     2,554,025
MARKET BASKET
Filed May 14, 1949
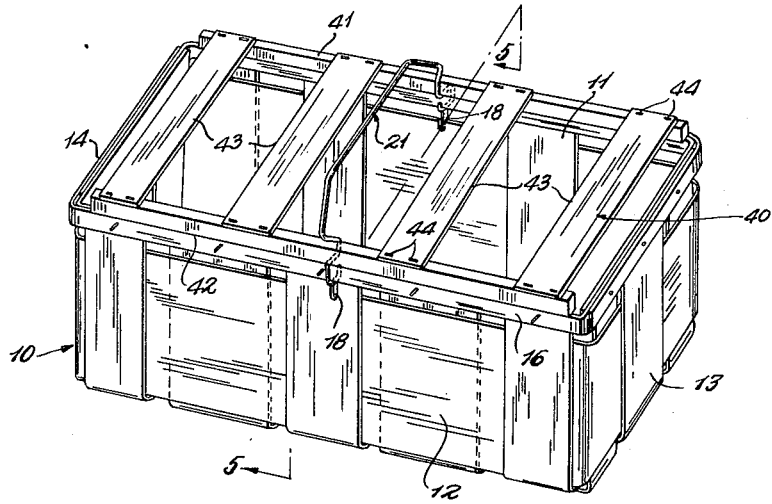
INVENTOR.
FRANK M. HARRISON
BY Hudson, Boughton,
Williams, David & Hoffmann.
ATTORNEYS Patented May 22, 1951

2,554,025

UNITED STATES PATENT OFFICE 2,554,025

MARKET BASKET

Frank M. Harrison, Painesville, Ohio

Application May 14, 1949, Serial No. 93,305

1 Claim. (Cl. 217—124)

The present invention relates to baskets and, particularly, to market baskets having detachable, bail-type handles and covers.

It is customary to ship large quantities of fresh vegetables, either root or leafy, such as, radishes, carrots, lettuce, spinach, etc., from the milder southern climate to the northern markets, particularly during the winter season, in rectangularly-shaped baskets. After the baskets are packed, they are loaded for shipment north into trucks or railroad cars wherein they are stacked one upon the other. The load is iced usually by spreading two or three inches of crushed ice and, often more, between each layer of baskets and/or by placing a foot or so of ice upon the top of the load. During transit, the ice melts and the cold water drips down through the vegetables and keeps them moist, cool and fresh. While the basket of the present invention may be otherwise employed, it is especially well suited for use as a vegetable basket of the character referred to and is, therefore, preferably made of hardwood veneer which is more rigid and will withstand moisture better than soft wood. Since the hard woods suitable for making such baskets are usually found in the North, large quantities of these baskets are shipped to the South; and it is desirable to have the baskets free from handles during shipment south so that they can be nested one within the other. The construction is also preferably such that the handles can be readily assembled with the baskets proper and without the use of machines when the baskets are to be used. The baskets usually include covers and must otherwise be strong enough to withstand the pressures to which they are subject during shipment.

With the foregoing in mind, the principal object of the invention is the provision of a novel and improved basket of the character referred to, which basket will be inexpensive to manufacture and can be readily shipped in nested arrangement, which has a detachable handle that can be readily assembled with the basket proper without the use of tools or machines, which handle stands upright when assembled and will not become loose or free from the basket proper, and which basket includes a cover that locks the handle in assembled relation with the basket proper, prevents the basket from spreading, and otherwise reinforces the basket.

Another object of the invention is the provision of a new and improved basket including a detachable, bail-type handle comprising an inverted, generally U-shaped, resilient member, the side portions of which have sections adapted to extend downwardly along the exterior of opposite sides of the basket and having hooked ends which project inwardly through openings in the sides of the basket and extend upwardly on the inside of the basket and which side portions also have outwardly facing, notch-like formations immediately above the sides of the basket, the lower sides of which notch-like formations overlie the top edges of the sides of the basket, and a cover including two side members adapted to be received within the notch formations of the handle and which side members are connected by cross members and prevent spreading of the handle and basket.

Another object of the invention is the provision of a new and improved, detachable handle for a basket of the character referred to, which handle comprises an inverted, generally U-shaped, resilient member, having inwardly extending hooked ends, the side or leg portions of which have sections adapted to extend downwardly along the exterior of opposite sides of the basket with the hooked ends of the side portions projecting inwardly through openings in the basket and upwardly along the inside, and which side portions also have outwardly facing, notch-like formations immediately above said sections, the lower sides of which notch-like formations are adapted to overlie the top edges of the sides of the basket and which notch-like portions are also adapted to receive a cover for locking the handle in assembled relation with the basket proper.

The invention resides in certain constructions and combinations and arrangements of parts and further objects and advantages will be apparent to those skilled in the art to which it relates from the following description of the preferred embodiment described with reference to the accompanying drawings forming a part of this specification, in which Fig. 1 is a perspective view of a basket embodying the invention; and Figs. 2, 3, 4, and 5 are fragmentary, sectional views taken along line 5—5 of Fig. 1 showing successive positions of various elements during the process of attaching the handle and the cover to the basket proper.

In general, the invention, as previously stated, relates to a new and improved basket having a bail-type, detachable handle and a cover which cooperates with the handle to maintain the latter connected with the basket and to reinforce the basket. The basket proper, which may be of conventional construction, is provided with openings in its opposite sides for receiving the lower reversely bent end portions of a U-shaped handle made of resilient material such as a wire. The legs or sides of the handle extend downwardly along the outside of the sides of the basket and into the respective openings in the side walls. The handle has outwardly facing, notch-like formations in its opposite sides, the lower sides of which notch-like formations overlie the top edges of the sides of the basket and assist in holding the handle assembled with the basket. The cover includes two opposite side members which are adapted to be received within the respective notch-like formations of the handle and which side members are connected together by cross pieces. When the cover is assembled on the basket, it helps to prevent spreading of the basket and the handle element and disengagement of the handle member from the basket.

Referring to the drawing, the basket 10 shown is particularly suitable for packing, storing and shipping of vegetables, both root and leafy, such as radishes, carrots, lettuce and the like, and is preferably formed of hardwood veneer strips woven together and folded to form side walls 11, 12 and end walls 13, 14. The upper edges of the basket are reinforced by two parallel bands or wood strips 16, 17 which are secured to opposite sides of the veneer strips by staples or nails. The basket thus far described is of conventional construction and it is to be understood that the basket may be constructed in any suitable manner and of any desirable material. The construction described is particularly suitable for the purpose indicated as the walls are relatively sturdy and resilient and will withstand moisture.

The side walls 11, 12 of the basket have two vertically extending, slot-like openings 18, 19 formed therein immediately beneath the reinforcing bands 16, 17. The slots 18, 19 are located midway between the ends of the basket and are adapted to receive the ends of a bail-type handle 21 made of any suitable material, such as round or square wire or strip and including metal or plastic.

The handle 21 comprises an inverted, generally U-shaped, resilient member preferably made of wire, including a top portion 22, adapted to span the basket 10, and two leg or side portions adapted to be detachably secured to the sides of the basket. For this purpose, the side portions of the handle have sections 23, 24 adapted to extend downwardly along the outer surfaces of the sides 11, 12 of the basket, and which sections 23, 24 have hook formations 25, 26 at their lower ends which project into the slots 18, 19, respectively, and extend upwardly a short distance along the inside of the sides 11, 12. As shown in Figs. 4 and 5, for example, the hook portions, 25, 26 engage the underside of the reinforcing bands 16, 17 of the basket.

Notch formations 30, 31 are made in the sides of the handle immediately above the portions 23, 24 and the lower sides or sections 32, 33 thereof overlie and engage the top edges of the reinforcing bands 16, 17. The notch formations 30, 31 face outwardly, that is to say, the closed sides of the notches, which sides are formed by sections 35, 36 of the handle, are disposed inwardly with respect to the basket. The sides of the notch formations opposite the sections 32, 33 form overhanging shoulders 38, 39, the purpose or function of which will be described later.

The handle 21 is attached to the basket proper by first inserting the hook portion 26 into the slot 19, see Fig. 2, with the operator standing on the right-hand side of the basket, as viewed in the figure. When the right-hand or near side of the handle is lowered to the position shown in Fig. 3, the reinforcing bands 16, 17 will be embraced between the hook 26 and the section 33, as shown in Fig. 3 as the right-hand side of the handle is brought to the position shown. The wall 11 of the basket is flexed inwardly, see Fig. 3, and the hook portion 25 inserted into the opening 18 whereupon the side of the basket is released and allowed to spring outwardly to cause the reinforcing bands 16, 17 to be embraced between the hook portion 25 and the section 32, as seen in Fig. 4. The handle 21 is of such resiliency that the ends thereof are normally urged inwardly against the upper side portions of the basket and maintain it in supporting engagement with the basket.

After the basket is packed, a cover 40 is placed thereover. The cover comprises two spaced, parallel sticks or bars 41, 42 which are interconnected by slats 43 attached thereto by any suitable means, such as staples 44. The bars 41, 42 are adapted to be received within the notch formations 30, 31 of the handle when the cover is in place on the basket. To attach the cover to the basket, one of the bars 42, for example, the one on the far side with respect to the operator, is placed edgewise into the notch formation 31 with the opposite bar 41 resting against the opposite side of the handle, as seen in Fig. 4. The basket and handle are then compressed inwardly to allow the bar 41 to pass downwardly over the shoulder 38, whereupon the basket and handle spread outwardly so that bar 41 is firmly held in the notch formation, between sections 32, 33 and shoulders 38, 39, respectively, see Fig. 5. It will be apparent that the bars 41, 42 of the cover, which are tied together by the slats 43, prevent the handle from spreading and that although a considerable load is placed on the baskets and/or handles, the handles will remain attached to the baskets and in turn prevent the sides of the baskets from spreading and the baskets from crushing.

While the preferred form of the invention has been described in considerable detail, it will be apparent that the invention is not limited to the constructions shown or the uses referred to and it is my intention to cover hereby all adaptations, modifications, and changes which come within the practice of those skilled in the art to which the invention relates and the scope of the appended claim.

Having thus described my invention, I claim:

A basket having a reinforcing band along the top portions of opposite sides thereof and having an opening in opposite sides spaced from the top of the basket, said sides of the basket being resiliently flexible inwardly, a detachable bail-like resilient wire handle for said basket comprising an inverted generally U-shaped member the sides or legs of which have end sections extending downwardly along the exterior of said bands, respectively, through said openings and upwardly along the insides of the basket to cooperate with the insides of the basket to hold said legs of said handle to said basket, said handle legs having an outwardly facing notch formation adjacent to each of said end sections, the lower sides of which notch formations are spaced from the section extending through said openings an amount substantially equal to the space between said openings and the top of the basket so as to overlie and cooperate with the top edges of the basket to retain said handle assembled with the basket, and a cover for said basket comprising two side members extending longitudinally of said cover and interconnected by cross members to retain said side members in spaced relationship corresponding substantially to the width of the basket, said side members engaging in said notch formations respectively, the spacing of the top and bottom sides of said notch formations being substantially equal to the spacing of the top and bottom portions of said side members engaged in said notch formations whereby said side members and cover are held by said notch formations to the top of the basket and said cross members of said cover and said side members restrain said handle legs and basket sides from spreading, said handle legs being resiliently deflectable inwardly to release said side members from the sides of said notch formations.

FRANK M. HARRISON.

REFERENCES CITED

The following references are of record in the file of this patent:

UNITED STATES PATENTS

| Number | Name | Date |
|---|---|---|
| 412,105 | Lewis | Oct. 1, 1889 |
| 669,768 | Sitterly | Mar. 12, 1901 |
| 849,402 | Kenny | Apr. 9, 1907 |
| 1,467,891 | Barker | Sept. 11, 1923 |
| 1,581,407 | Townsend | Apr. 20, 1926 |